(12) United States Patent
Binder et al.

(10) Patent No.: US 12,244,189 B2
(45) Date of Patent: Mar. 4, 2025

(54) DYNAMOELECTRIC MACHINE HAVING COOLING OF THE SLIP RING SYSTEM

(71) Applicant: Flender GmbH, Bocholt (DE)

(72) Inventors: Herbert Binder, Neuburg (DE); Georg Brunner, Bad Birnbach (DE); Nicole Devingtel, Fürstenzell (DE); Daniel Friedl, Fürstenzell (DE); Thomas Garhammer, Buechlberg (DE); Robert Gruber, Ruhstorf (DE); Lorenz Hraska, Triftern (DE); Oliver Memminger, Neuburg a. Inn (DE); Günther Ortmeier, Ruhstorf a. d. Rott (DE); Matthias Reisinger, Ruhstorf a. d. Rott (DE); Klaus Schifferer, Neuhaus am Inn (DE); Markus Sentef, Ruhstorf (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/272,751

(22) PCT Filed: Jan. 11, 2022

(86) PCT No.: PCT/EP2022/050419
§ 371 (c)(1),
(2) Date: Jul. 17, 2023

(87) PCT Pub. No.: WO2022/152685
PCT Pub. Date: Jul. 21, 2022

(65) Prior Publication Data
US 2024/0162794 A1    May 16, 2024

(30) Foreign Application Priority Data
Jan. 18, 2021 (EP) .................................. 21152087

(51) Int. Cl.
*H02K 17/24* (2006.01)
*H02K 7/18* (2006.01)
(Continued)

(52) U.S. Cl.
CPC ............. *H02K 17/24* (2013.01); *H02K 7/183* (2013.01); *H02K 9/04* (2013.01); *H02K 9/28* (2013.01); *H02K 13/003* (2013.01)

(58) Field of Classification Search
CPC .......... H02K 17/24; H02K 7/183; H02K 9/04; H02K 9/28; H02K 13/003; F03D 9/25; H01R 39/08; Y02E 10/72
See application file for complete search history.

(56) References Cited

U.S. PATENT DOCUMENTS

| | | | | |
|---|---|---|---|---|
| 1,010,522 A | * | 12/1911 | Roos | ........................ H02K 3/24 |
| | | | | 310/64 |
| 3,997,803 A | * | 12/1976 | Mishra | ..................... H02K 1/32 |
| | | | | 310/59 |

(Continued)

FOREIGN PATENT DOCUMENTS

| | | |
|---|---|---|
| DE | 504 351 | 8/1930 |
| DE | 918 876 | 10/1954 |

(Continued)

OTHER PUBLICATIONS

International Search Report issued by the European Patent Office in International Application PCT/EP2022/050419 on Mar. 23, 2022.

*Primary Examiner* — Pedro J Cuevas
(74) *Attorney, Agent, or Firm* — Henry M. Feiereisen LLC (57) ABSTRACT

A dynamoelectric machine includes a shaft, a rotor arranged fixedly on the shaft for conjoint rotation, and a slip ring system enabling a rotor winding system to be contacted electrically and including a slip ring body having slip rings arranged spaced-apart axially behind one another and (Continued)

assigned to an electrical phase. The slip ring body is connected fixedly to the shaft for conjoint rotation and has between an inner side thereof and the shaft a section which forms an axially open cavity on both skies. In a region of the slip ring system, the shaft is hollow with a hollow shaft portion assigned to the slip ring system for routing feed lines to the rotor winding system. Recesses are provided on the cavity axially on an inside and axially on an outside for introducing a cooling medium flow axially into the cavity and discharge thereof into an outlet region.

14 Claims, 7 Drawing Sheets

(51) Int. Cl.
*H02K 9/04* (2006.01)
*H02K 9/28* (2006.01)
*H02K 13/00* (2006.01)

(56) References Cited

U.S. PATENT DOCUMENTS

| | | | | |
|---|---|---|---|---|
| 4,137,474 | A * | 1/1979 | Krieger | H01R 39/08 310/227 |
| 5,049,771 | A * | 9/1991 | Challita | H02K 13/003 310/410 |
| 8,872,406 | B2 * | 10/2014 | Schwery | H02K 9/28 310/227 |
| 9,793,784 | B2 * | 10/2017 | Tominaga | B60L 3/0061 |
| 2012/0200194 | A1 * | 8/2012 | Schwery | H01R 39/08 310/227 |
| 2024/0162794 | A1 * | 5/2024 | Binder | H02K 9/28 |

FOREIGN PATENT DOCUMENTS

| | | |
|---|---|---|
| DE | 198 07 708 | 8/1999 |
| DE | 102013021745 | 6/2015 |
| EP | 2 701 286 | 2/2014 |
| EP | 2 887 509 | 6/2015 |
| EP | 3 322 047 | 5/2018 |
| JP | S56-162953 | 12/1981 |
| JP | S59-3768 | 1/1984 |
| WO | WO 2018/041617 | 8/2017 |

* cited by examiner

DYNAMOELECTRIC MACHINE HAVING COOLING OF THE SLIP RING SYSTEM

CROSS-REFERENCES TO RELATED APPLICATIONS

This application is the U.S. National Stage of International Application No. PCT/EP2022/050419, filed Jan. 11, 2022, which designated the United States and has been published as International Publication No. WO 2022/152685 A1 and which claims the priority of European Patent Application, Serial No. 21152087.9, filed Jan. 18, 2021, pursuant to 35 U.S.C. 119(a)-(d).

BACKGROUND OF THE INVENTION

The invention relates to a dynamoelectric machine, in particular a double-fed asynchronous machine with a slip ring system, as a generator of a wind power plant.

In the case of double-fed asynchronous machines, a three-phase system is active in the rotor. Here, a slip ring system is used for power transmission. In the case of a slip ring system of this type, the electrical three-phase system is transmitted via stationary brushes to slip rings and therefore the rotating part of the machine, the rotor. Here, the three-phase system is conducted via corresponding conductors to the rotor winding of the rotor.

A slip ring system of this type for a dynamoelectric machine, in particular double-fed asynchronous machine, is used in wind power plants, for example. There is a requirement here that the electrical machines or the generators and their components are of ever more compact design. This leads to the slip ring components being increasingly loaded thermally with a constant overall size, since the temperatures rise greatly, in particular of slip rings, slip ring brushes and brush holders.

There is therefore a requirement for all the components of the electrical machine, in particular also the slip ring, to be cooled as efficiently as possible, in order thus to avoid the permissible maximum temperatures being exceeded and it no longer being possible for the operation of the generator to be ensured.

An attempt has been made to compensate for the rising temperatures in the slip ring system which are caused by increasing power outputs by way of an increase in the surfaces (slip ring, brushes, housing), with the result that the temperatures are again in the permissible range. In addition, a fan in the slip ring housing ensures air circulation, by air being conducted from outside (interior space of the nacelle) through the entire slip ring system and therefore ensuring the necessary cooling of the system.

Furthermore, EP 3 322 047 A1 has disclosed a slip ring unit, in the case of which insulating segments between slip rings have shapes for cooling.

EP 2 887 509 A1 has disclosed a dynamoelectric machine, in particular a double-fed asynchronous machine (ASM), with a stator and a rotor which is arranged fixedly on a shaft for conjoint rotation, each with a winding system, it being possible for the winding system of the rotor to be contacted electrically via a slip ring system, an electrical energy transmission unit of the slip ring system, in particular a brush unit, one or more brushes being assigned to a slip ring per electrical phase, the brushes being arranged on a brush holder, a slip ring body of the slip ring system which has slip rings which are arranged axially behind one another, are assigned to one electrical phase, and are spaced apart from one another in an insulated manner, the slip ring body being connected fixedly to the shaft for conjoint rotation, and forming a cavity which is open axially on both sides at least hi portions between the inner side of the slip ring body and the shaft. This apparatus forms the preamble of claim 1. It already provides effective cooling.

Proceeding herefrom, the invention is therefore based on the object of further improving a slip ring system of a dynamoelectric machine, in particular a double-fed asynchronous machine, above all of a wind power plant, with regard to the cooling performance.

SUMMARY OF THE INVENTION

The addressed object is achieved by way of a dynamoelectric machine, in particular a double-fed asynchronous machine (ASM) with the features as set forth hereinafter.

The special feature of the invention is that the shaft is a hollow shaft at least in the region of the slip ring system, in the hollow shaft portion of which, which is assigned to the slip ring system, the feed lines to the winding system of the rotor are routed, and that recesses (bores) are provided on the cavity axially on the inside and axially on the outside, through which recesses a cooling medium flow (gas, liquid or preferably cooling air) can be introduced axially into the cavity and can be discharged into an outlet region, in particular into the intake region of a fan. The cavity which is formed by the slip ring system is therefore used for the first time for routing and cooling the highly thermally loaded current felines to the rotor windings.

According to the invention, the cooling performance is improved by virtue of the fact that not only the brushes, but rather also the feed lines to the winding system of the rotor are cooled. To this end, the feed lines are routed at least in the region of the slip ring system within the shaft which to this end of course has to be of hollow configuration there. Then (that is to say, during operation), cooling medium (preferably cooling air) is conducted through the cavity between the shaft and the slip ring body, that is to say so as to sweep over the hollow shaft axially and so as to cool it. To this end, openings, recesses or bores are provided at the axial start and at the axial end of the cavity, through which openings, recesses or bores the cooling air is conducted axially. The cooling air is preferably conducted axially directly to the outlet region from the slip ring system, that is to say to the intake region of a blower or fan. The direct axial inflow or extraction increases the air throughput and improves the cooling performance. The inventors have recognized that precisely the cooling of the feed lines is important, besides or in addition to the cooling of the contact brushes.

In this way, an internally cooled slip ring body can then be provided according to the invention via the cavity which is open axially on both sides with axial inlet and discharge openings. Here, not only the slip ring body can be cooled radially from the inside, but rather the cavity also contributes, inter alia, to the cooling of the shaft and the feed lines in this region of the shaft. The cavity therefore forms a heat sink there during operation of the slip ring system and therefore of the dynamoelectric machine.

Since the shaft is of hollow configuration at least in the axial region of the slip ring body, in order to conduct the excitation power via electrical conductors from the slip ring system into the rotor or armature, the shaft portion which can be cooled can also be used to cool the conductors which run there.

The conductors are configured as flexible conductors, for example stranded conductors, or as rigid conductors, in the form of a rail system, and serve to excite a winding system of the rotor or armature.

As a result of the configuration according to the invention of the slip ring body, the slip ring body and additionally the following components can now be cooled: the shaft, in particular the axial shaft portion, and, in the case of a hollow shaft, the stranded conductors which run in the shaft and, in particular, are arranged therein. In other words, the slip ring body, the shaft and the conductors for the excitation power which run in the shaft or the axial hollow shaft portion can then be cooled in a targeted manner, that is to say the thermal load of these components can be absorbed by way of a coolant, in particular a cooling air stream.

The slip rings have an annular shape, that is to say they are hollow on the inside and have a defined ring width. They serve to transmit electrical energy of a static supply system to a rotating part (armature) of a double-fed asynchronous machine. Here, the transmission as a rule takes place by means of (contact) brushes made from carbon which are guided along the surface of the slip rings and in the process transmit electrical energy to the slip rings which the latter then provide via electrical conductors to the winding system of the armature.

The individual slip rings of each electrical phase are surrounded in the axial direction in each case by insulating segments which insulate the slip ring bodies electrically with respect to one another. A grounding ring is likewise insulated with respect to the adjacent slip ring. A supporting ring is arranged at the other axial end of the slip ring body, which supporting ring is connected by means of connecting means (for example, bolts), inter alia to the individual slip rings and the insulating bodies, in order to give the slip ring body the necessary mechanical stability.

In the case of a three-phase system to be transmitted, the slip ring body has three slip rings, a grounding ring which is connected electrically to the supporting structure, and an insulating sleeve, in order to insulate the slip rings with respect to the grounding ring and/or with respect to one another. The insulating sleeve is arranged on the respective portion of the supporting structure.

A different electrical phase of the three-phase system is as a rule conducted via each slip ring. The grounding ring is connected to the grounding system, for example, of the dynamoelectric machine and/or an overall system.

In one embodiment, the cavity is configured as a circumferential cutout, with the result that the slip ring body is connected fixedly to the shaft for conjoint rotation at least on two circumferentially running end portions or boundary elements which are spaced apart axially from one another and thus produces the cavity which is one cooling portion. These end portions or boundary elements are configured, in particular, as rings or webs. They are part of the supporting structure and/or the shaft. Therefore, they are configured in one piece with the one or the other part, and form the cooling portion by way of the slip ring body being plugged axially onto the shaft or hollow shaft. There are axially running recesses or bores which make the above-described cooling possible in the end portions or boundary elements, in particular the rings or webs.

Here, these recesses or substantially axially running bores are then provided on the circumference of the supporting structure and/or shaft in the region of the fixed connection for conjoint rotation, for example a shrink fit. These recesses or substantially axially running bores are provided both on the bearing side (that is to say, the side which faces the armature) and on the connector side (that is to say, the side which faces away from the armature).

The cooling then takes place, for example, in such a way that cooling air is sucked in on the bearing side through further recesses on the grounding ring or is pressed there by a blower/fan. This cooling air passes through the cooling portion, that is to say via these recesses or substantially axially running bores of the end portions, into the cavity, and absorbs the thermal load there. Via a fan, for example on the connector side, the heated air is conveyed outward via openings in a slip ring housing. There, this heated air is ejected or recooled.

In a further embodiment, the abovementioned cooling means supplements an existing cooling circuit, in the case of which brushes and the slip ring surface are already cooled by way of radial fans. As a result of the internally cooled slip ring body, there is therefore a further cooling circuit for the shaft, the conductors which run in the shaft, and the slip ring body.

As a result of this cooling circuit, the temperatures of the stranded conductors or a rail system in the shaft and the slip ring body are reduced considerably by way of the additionally provided cooling circuit. In this way, higher power outputs can be realized with the same components in the same installation space of the slip ring system, which has an extremely cost-saving effect.

As a result of this construction, cool ambient air (or recooled air in the case of a closed system) is conducted through the greatly heated region between the shaft and the slip ring body, that is to say the cavity, and the conductors, in particular stranded conductors in the shaft of the hallow shaft portion, are also cooled in this way. The discharge of the heated air takes place through openings on the grounding ring and through recesses or bores on the bearing side and on the connector side on the entire circumference of the slip ring body in the end portions. The cooler air is conducted through these openings and the recesses or bores into the cavity between the shaft and the slip ring body.

The air stream to be generated is assisted by way of a dedicated or an already present fan in the slip ring housing. As a result, the air is conducted directly to the heated points of the slip ring body, the shaft and indirectly the stranded conductors. The regions between the shaft, the slip ring body and the strands remain in the permissible temperature range as a result, and overheating of the slip ring system is therefore prevented. A slip ring body with this cooling concept can therefore be used for considerably higher power outputs than up to now.

Specifically, the cavity can be produced radially within the slip ring body, by the shaft having a reduced diameter portion over a predefined axial length and/or the slip ring body having a widened diameter portion in the region of the envisaged cavity. In this way, the slip ring body is connected fixedly to the shaft for conjoint rotation at least via two circumferentially running boundary elements which are spaced apart from one another, such as rings or webs. In this way, the cavity is configured which represents a cooling portion. The boundary elements, that is to say the rings or webs, are part of the supporting structure of the slip ring body and/or the shaft. Therefore, they are configured in one piece with the one or the other part, and form the cooling portion by way of the slip ring body being plugged axially onto the shaft or hollow shaft. There are axially running recesses which make the above-described cooling possible in the boundary elements, for example the rings or webs.

In order to increase the cooling efficiency, the cavity can have meandering or labyrinth-like structures which extend the dwell time of a cooling air flow in the cavity and therefore allow the cooling air flow to absorb a higher thermal load there.

The structures can be dedicated elements which can be inserted, or can already be machined into the slip ring body and/or the shaft.

The temperatures of the electric machine such as, for example, the shaft and the rotor are fundamentally also reduced considerably by way of the cooling of the slip ring body which bears axially against the electric machine.

The temperature of the slip ring body which is lower as a result permits smaller overall sizes of the slip ring bodies or the slip ring system. The slip ring system can be loaded with more brushes per phase as a result, which would not be possible without cooling of this type. Therefore, higher power levels can be realized with an identical overall volume of the slip ring system than up to now.

Moreover, additional cooling of the slip ring system takes place by way of correspondingly designed slip rings, for example with grooves in the running surfaces which make a radial air flow possible, and also with axial bores in the slip ring which make an axial cooling air flow possible. In addition or instead, the insulating segments between the slip rings can likewise have a fan-like design, in order to provide turbulence in the slip ring housing in the case of rotation of the slip ring body.

Cooling of the brush device can likewise additionally be performed, by the brush shaft having being provided with surface area-increasing measures. Air flows which are oriented in a targeted manner by means of external fans and/or guiding apparatuses likewise contribute to cooling within the slip ring housing.

The slip rings, their running surfaces, the brushes, the cable feed lines and other components of the system therefore remain in a correct operational temperature range as a result of these measures. The operation of the dynamoelectric machine is thus protected against overheating. In this way, substantially smaller, less expensive components can be used overall, and thus problem-free operation of the electric machine can be ensured. In addition to a use in the case of generators, for example for wind power plant, the invention can also be used in the case of motors.

The cooling circuits can be configured as closed cooling circuits or open cooling circuits. In the case of a closed cooling circuit, the cooling medium, for example air, can be recooled in a targeted manner, for example by way of a heat exchanger. In the case of an open cooling circuit, the cooling medium, for example air, can be used from the surrounding area and can be discharged to the surrounding area again in a heated state.

BRIEF DESCRIPTION OF THE DRAWING

The invention and further advantageous refinements of the invention will be explained in greater detail in the following text on the basis of schematically shown exemplary embodiments, in which.

DETAILED DESCRIPTION OF PREFERRED EMBODIMENTS

Figure 1:
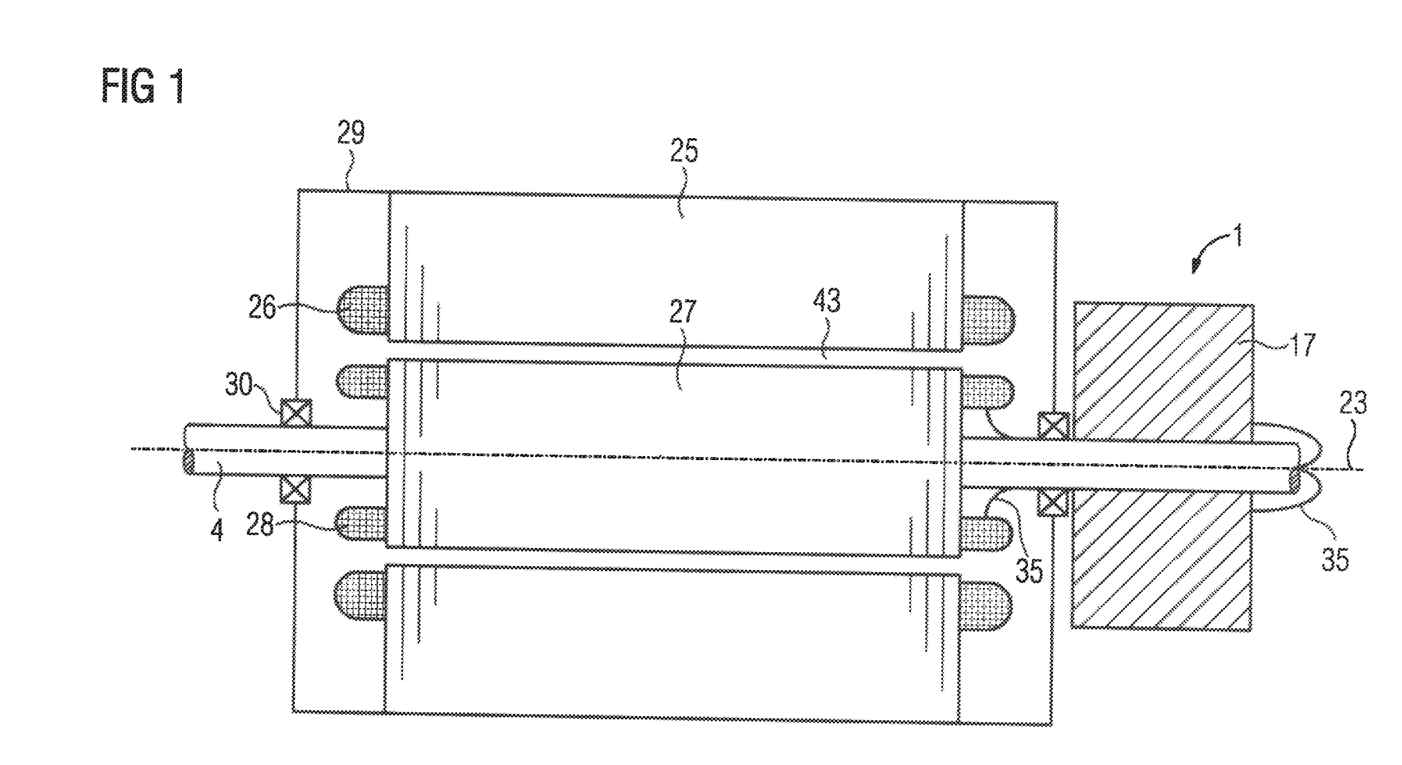
FIG. 1 shows a longitudinal section of a diagrammatic machine.

FIG. 1 shows a schematic longitudinal section of a dynamoelectric machine 24 and a housing 29. A stator 25 which has a winding system 26 in grooves (not shown in greater detail) of a laminated core of the stator 25 is inserted in the housing 29. Winding heads are formed by way of the winding system 26 on the end sides of the stator 25. A rotatably mounted rotor 27 with a winding system 28 is situated spaced apart from the stator 25 by way of an air gap 43, which winding system 28 likewise configures winding heads on the end sides of the rotor 27. The rotor 27 is supported via bearings 30 and bearing plates on the housing 29 of the machine 24.

A slip ring system 1 which is connected via feed lines 35 to the winding system 28 of the rotor 27 is situated in an axial extension of the dynamoelectric machine 24 for electrical excitation of the rotor 27. Here, the feed lines 35 preferably run in a hollow shaft portion of the shaft 4.

As can also be gathered from the following figures, the slip ring system 1 has a slip ring body 2 and a brush unit 14 which are accommodated in a slip ring housing 17. Here, the slip ring body 2 has slip rings 3 which are arranged axially behind one another and are in each case spaced apart axially by an insulating segment 7. A grounding ring 6 is situated on one end side of the slip ring body 2, and an insulation ring 5 is situated on the other end side of the slip ring body 2. Contact pins 8 which are contacted electrically in each case to the respectively associated slip ring 3 emerge axially on this insulation ring 5.

The brush unit 14 is positioned in the slip ring housing 17 and has one or more brushes 15 per electrical phase, that is to say per slip ring 3, which brushes 15 are assigned to the respective slip ring 3 or the grounding ring 6. The brushes 15 are arranged in each case in a brush holder 22 which also provides corresponding electrical contacting devices. Here, the brushes 15 per slip ring 3 are arranged next to one another and/or behind one another.

Figure 2:
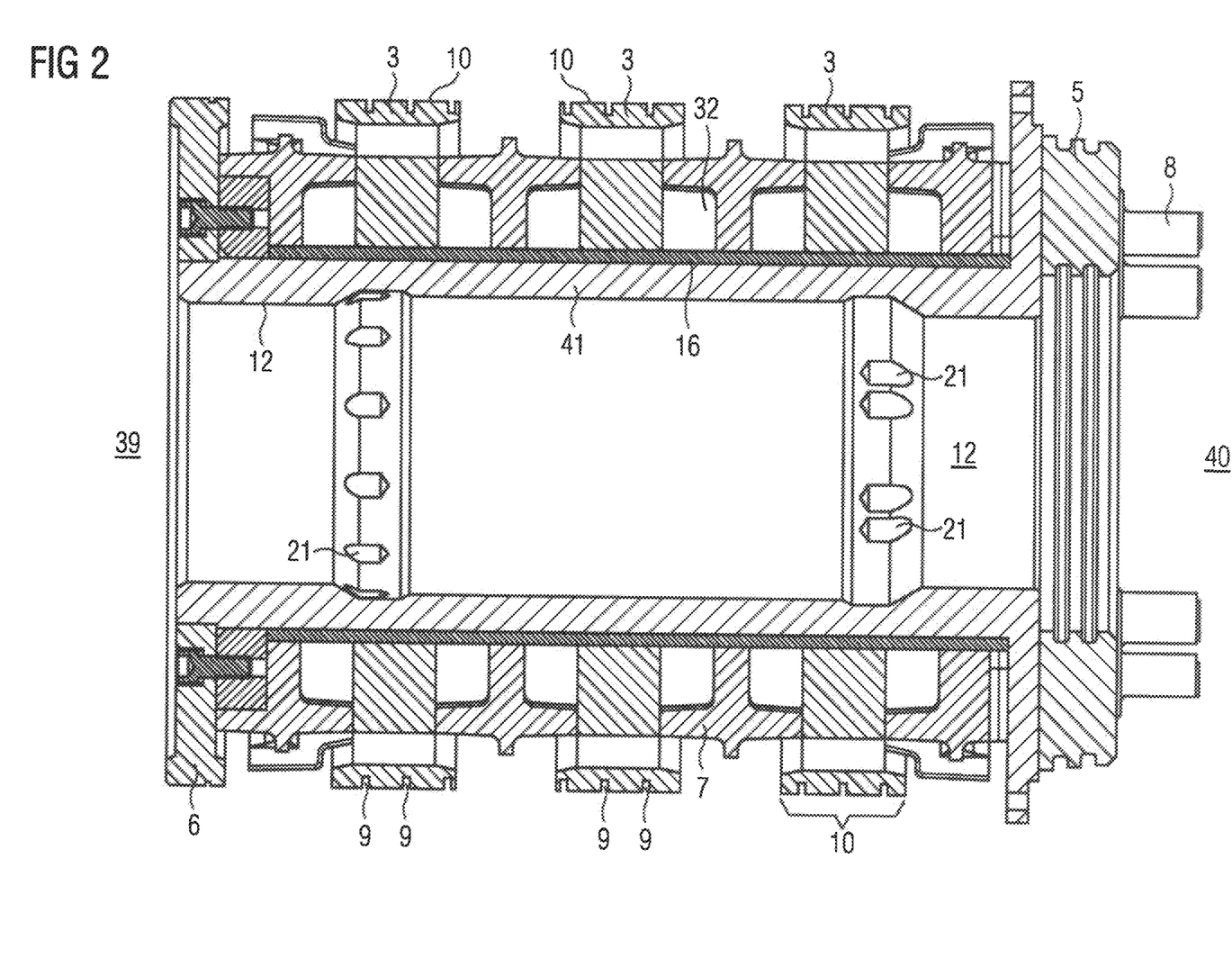
FIG. 2 shows a longitudinal section of a slip ring body.

In its schematic longitudinal section, FIG. 2 shows a slip ring body 2, the slip rings 3 being spaced apart axially behind one another and by respective insulating segments 7. The slip rings 3 are arranged on an insulating sleeve 16 which is arranged on a supporting structure 41 or hub. The supporting structure 41 is at an identical electrical potential to the grounding ring 6. Each of the slip rings 3 is contacted electrically to one or more contact pins 8, with the result that the electrical energy which is provided on the running surface 10 of the respective slip ring 3 can be fed to the contact pin 8, in order to be conducted from there via conductors, in particular stranded conductors through the hollow shaft or hollow shaft portion to the winding system 28 of the rotor 27.

On its radially inner side which faces the shaft 4, the slip ring body 2 has an axial portion which is recessed with regard to the end portions 12 which limit it, that is to say has a greater internal radius. There are openings 21 which act as aeration bores or ventilation bores in these end portions 12. As soon as the slip ring body 2 is situated on a shaft 4 or hollow shaft, this comparatively greater internal radius produces a cavity 11 between the two end portions 12 of the supporting structure 41, that is to say the axial boundary elements of the cavity 11 which can be configured as rings or webs.

Figure 3:
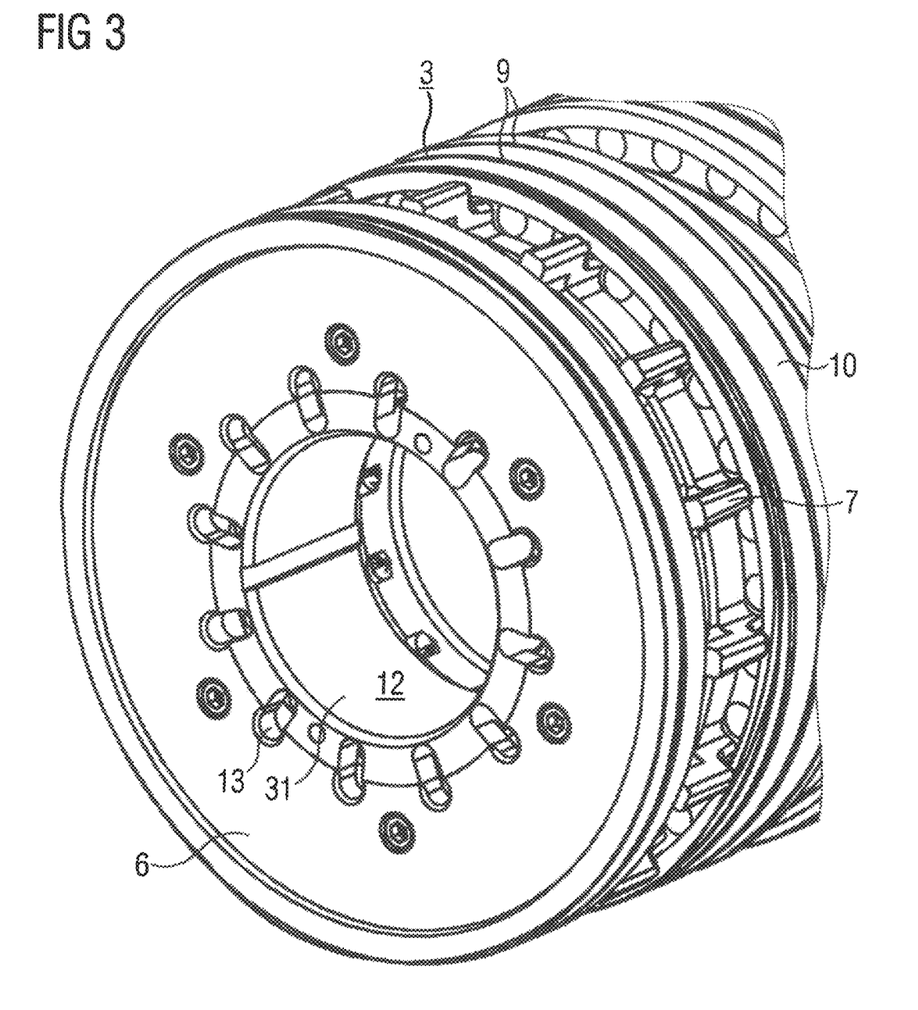
FIG. 3 shows a partial perspective illustration of a slip ring body.

FIG. 3 shows a partial perspective illustration of a slip ring body 2 from one end side, more precisely from the machine side or bearing side 39. Here, the grounding ring 6 and its spacing from a slip ring 3 by way of an insulating segment 7 can be seen on the end side of the slip ring body 2. In this case, the running surface 10 of a slip ring 3 can also be seen, on which running surface 10 grooves 9 are situated which also permit radial aeration of the slip ring 3. Openings 13 are provided on the grounding ring 6, which openings 13 permit an inflow of air via the openings 21 of the end portions or boundary elements into the cavity 11 which results between the shaft 4 and the slip ring body 2.

Figure 4:
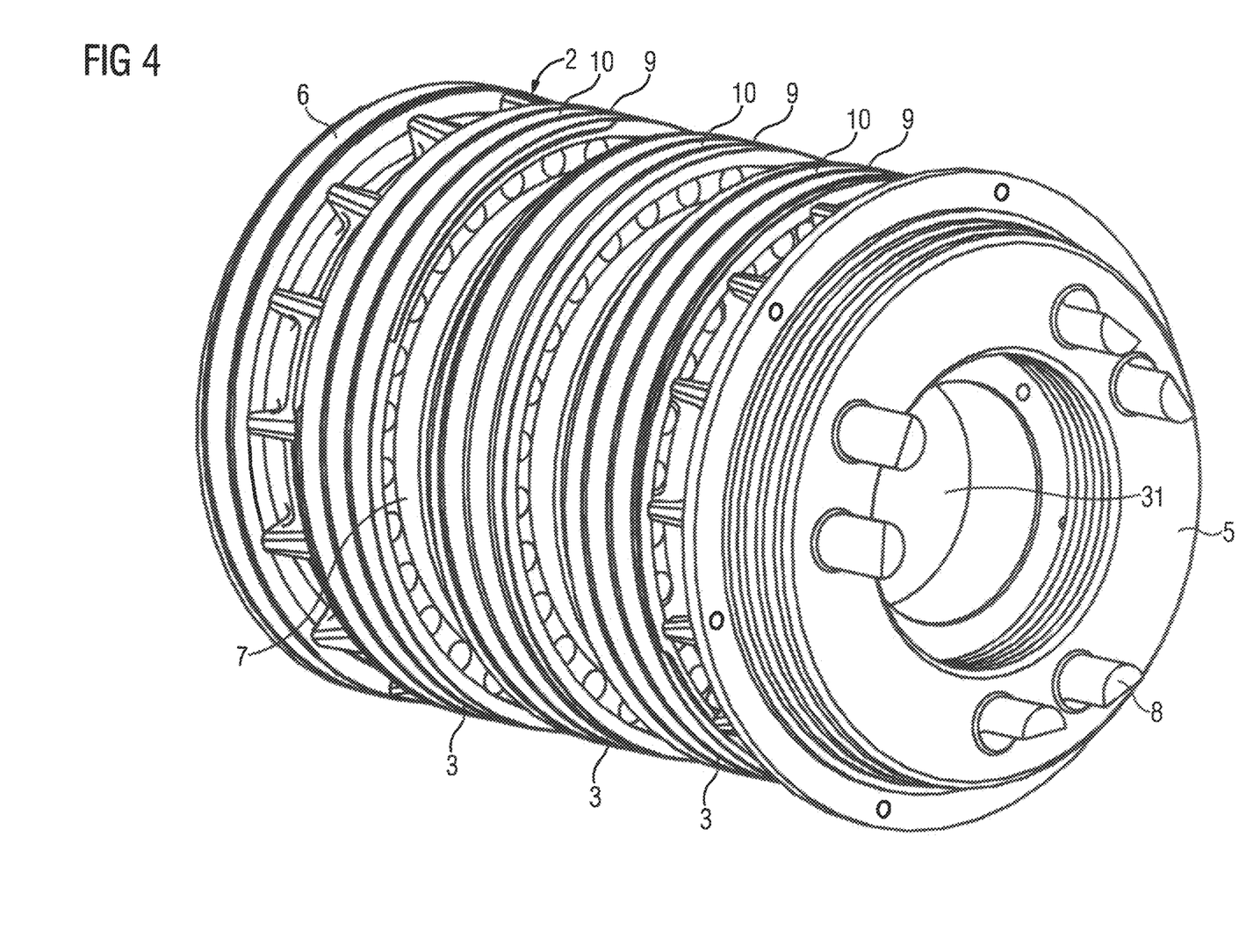
FIG. 4 shows a further perspective illustration of a slip ring body.

FIG. 4 shows a perspective illustration of the slip ring body 3 from its other end side, the connector side 40. Contact pins 8 emerge axially from the insulation ring 5, each electrical phase or each slip ring 3 in this case being assigned two contact pins 8. This is adjoined axially by a sequence of installation segments 7 and slip rings 3. The axial sequence is ended by the grounding ring 6. The running surfaces 10 of the individual slip rings 3 have grooves 9 which are radially continuous and thus possibly permit further cooling of the slip ring 3. Furthermore, these slip rings 3 have axial openings which likewise contribute to cooling of the slip rings 3. Regardless of this or in addition to this, the insulating segments 7 are of blade-like configuration on the radially outer edge, with the result that air turbulence occurs in the case of rotation of the slip ring body 2.

The slip ring body 2 has a central opening 31, into which a shaft 4, a shaft 4 for the axial hollow shaft portion, or a hollow shaft is inserted. This shaft 4 is connected fixedly to the slip ring body 2 for conjoint rotation. Via the contact pins 8 and electrical feed lines 35 which are connected to them, the winding system 28 of the rotor 27 is then supplied electrically via a hollow shaft portion of the shaft 4 or the hollow shaft.

Figure 5:
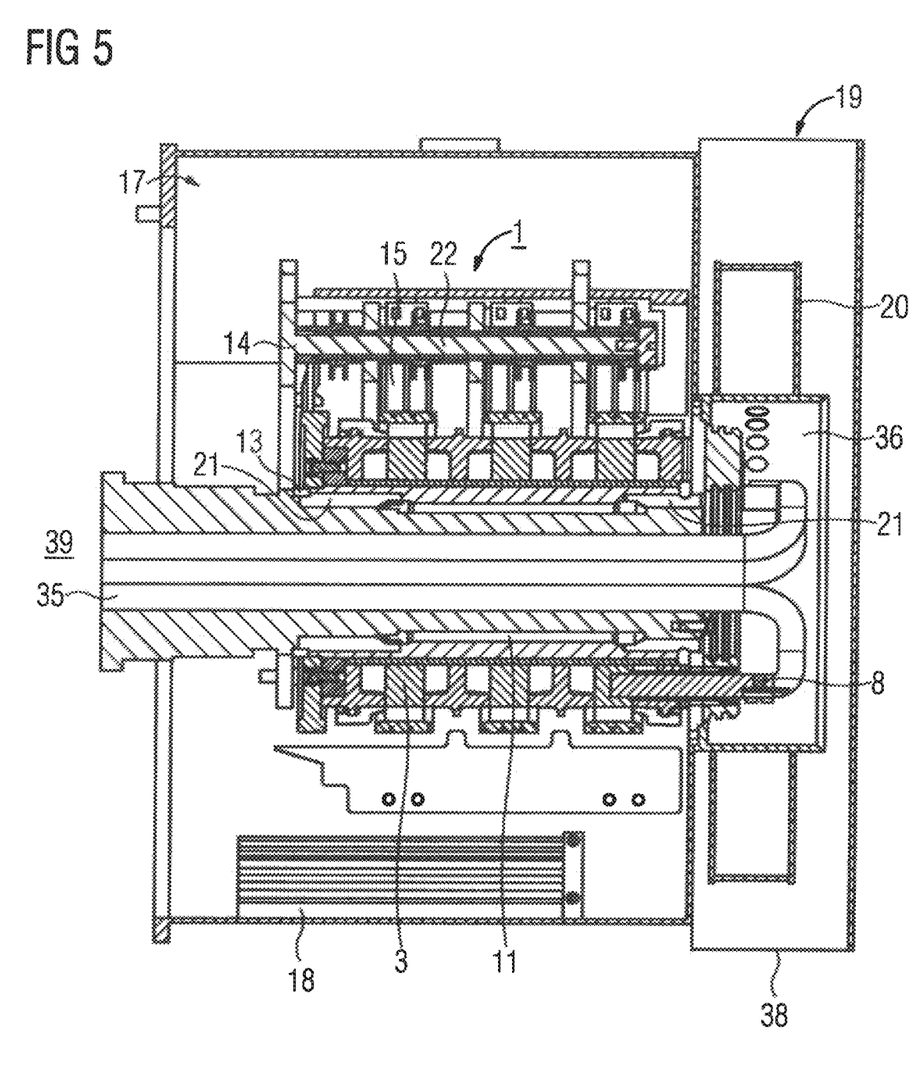
FIG. 5 shows a longitudinal section of a slip ring system.

FIG. 5 shows a longitudinal section of the slip ring system 1, with a slip ring body 2 and a brush unit 14. The slip ring body 2 is positioned fixedly on the shaft 4 with a hollow shaft portion or hollow shaft for conjoint rotation. Feed lines 35 in the form of stranded connectors are routed from the insulation ring 5 and the contact pins 8 arranged there through the hollow shaft or hollow shaft portion of the shaft 4 to the winding system 28 (not shown in greater detail in this figure) of the rotor 27. These feed lines 35 either lie freely in the hollow shaft or are embedded in a type of heat conducting paste, in order to obtain satisfactory thermal contact of the shaft 4.

Cooling of the slip ring body 2 from the inside and the shaft 4 can then take place as a result of the cavity 11 which is then configured between the outer circumferential surface of the hollow shaft and the inner surface of the slip ring body 2, via bores 21 in the end portions 12 which lie on the hollow shaft portion and are configured, in particular, as webs.

Here, the cooling takes place, in particular, by way of an air flow which is arranged by way of a fan unit 19 on the connector side 40. Here, a fan 20 sucks or presses a cooling air flow into the slip ring housing 17 which, by way of corresponding design of guide and conducting devices, guides the cooling air flow and steers it onto the heat sources of the slip ring system 1.

In the present case, the fan 20 is responsible, in particular, for the cooling air 33 through the cavity 11. Here, air from the surrounding area (from the nacelle in the case of a wind generator) is sucked in and is output again via an air outlet 36 at the slip ring system 1.

Figure 6:
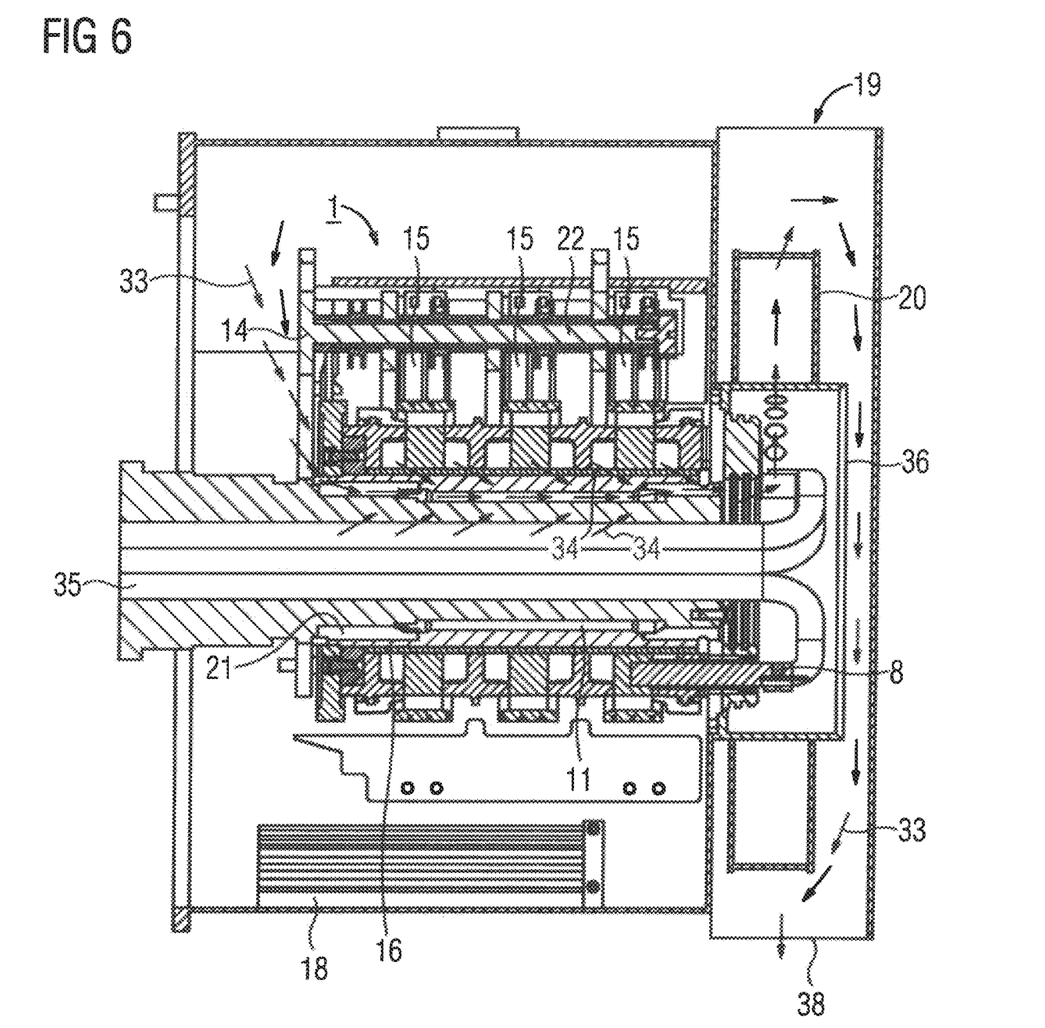
FIG. 6 shows a longitudinal section of a slip ring system with a schematic illustration of a cooling air flow.

FIG. 6 shows the course of the cooling air flows 33 arrangement according to FIG. 5. It can be seen here, in particular, that a heat input 34 into the cooling air 33 which is conducted through the cavity 11 takes place from the slip rings 3 and also from the shaft 4 and therefore also from the feed lines 35 (stranded conductors or rail system).

Figure 7:
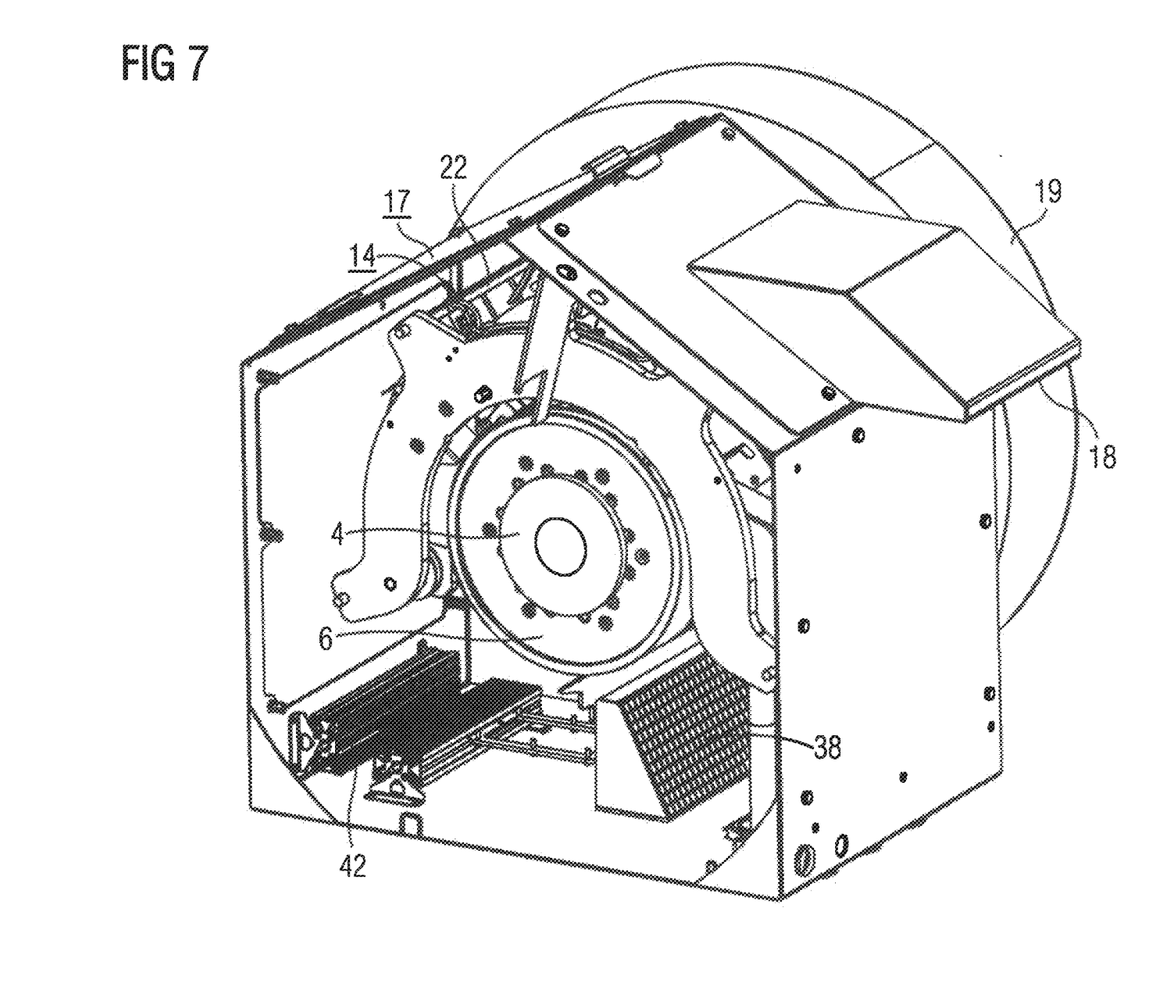
FIG. 7 shows a perspective illustration of an open slip ring system.

FIG. 7 shows a perspective illustration of the slip ring system 1 from the bearing side 39. Here, the slip ring housing 17 is shown with its air inlets 18 and air outlets 38 which make cooling of the slip ring system 1 possible. The brush unit 14 is supported in the slip ring housing 17. The slip ring body 2 with its slip rings 3 is positioned radially further to the inside and on a shaft 4 or hollow shaft or hollow shaft portion. The grounding ring 6 has openings 13, via which cooling air 33 can then be conducted via the bores 21 of the end portions 12 into and out of the cavity 11. The slip ring housing 17 is adjoined axially by a fan unit 19 which adjusts the fan 20 and also its distribution of the cooling air flows.

With the aid of the fan 20, the heated air is then preferably is sucked in from the cavity 11 and is discharged to the outside from the slip ring housing 17 through the fan cap 36. The contact pins 8 are also called in the process.

As a result, the temperatures of the slip ring system 1 and of the entire electrical machine 24 can be reduced considerably. This leads to smaller overall designs of the slip ring system 1 becoming possible, or higher power levels being achieved with an identical overall design.

In addition to this cooling of the cavity 11, additional cooling of the slip ring system 1 is possible via the grooves 9 of the running surfaces 10 and the axial openings in the slip rings 3 and the insulating segments 7 of fan-like configuration. The shapes of the insulating segments 7 and possibly a plurality of insulating segments 7 ideally form a fan here which is provided to distribute a cooling air flow in the direction of the parts to be cooled of the electric machine 24.

Dynamoelectric machines 24 of this type with a slip ring system 1 are configured, in particular, as double-fed asynchronous machines (ASM) which are preferably used as generators in the wind power plants in the power range between 0.5 and 8 MW. Here, the wind power plants can be erected on-shore or off-shore.

The invention claimed is:

1. A dynamoelectric machine, in particular a double-fed asynchronous machine, said dynamoelectric machine comprising:
   a stator;
   a shaft;
   a rotor interacting with the stator, said rotor being arranged fixedly on the shaft for conjoint rotation and comprising a winding system; and
   a slip ring system designed to enable the winding system of the rotor to be contacted electrically and comprising a slip ring body including slip rings which are arranged axially behind one another and spaced apart from one another in an insulated manner and which are assigned to an electrical phase, said slip ring body being connected fixedly to the shaft for conjoint rotation and having between an inner side of the slip ring body and the shaft at least one section designed to form a cavity which is open axially on both sides and is designed as a circumferential cutout so that the slip ring body lies at least on two circumferentially running boundary elements which are spaced apart axially from one another and which are connected through shrink fit in one piece with an inside of the slip ring body and/or of the shaft, wherein the shaft is designed at least in a region of the slip ring system as a hollow shaft which has a hollow shaft portion assigned to the slip ring system for routing feed lines to the winding system of the rotor, and wherein axial recesses are provided on the cavity axially on an inside and axially on an outside for enabling introduction of a cooling medium flow axially into the cavity and discharge of the cooling medium flow into an outlet region, with first ones of the axial recesses being formed about an entire circumference of one of the two circumferentially running boundary elements for introduction of the cooling medium flow, and with second ones of the axial recesses being formed about an entire circumference of the other one of the two circumferentially running boundary elements for discharge of the cooling medium flow.

2. The dynamoelectric machine of claim 1, wherein the slip ring system comprises an electrical energy transmission unit in the form of a brush unit which includes one or more brushes assigned to a corresponding one of the slip rings per electrical phase, said brush unit comprising a brush holder for arrangement of the one or more brushes.

3. The dynamoelectric machine of claim 1, wherein the boundary elements are designed as rings or webs.

4. The dynamoelectric machine of claim 1, wherein in a region of the cavity, the shaft has a reduced diameter portion over a predefined axial length and/or the slip ring body has a widened diameter portion.

5. The dynamoelectric machine of claim 1, wherein the cavity is designed to form a labyrinth-like and/or meandering structure in the cavity so as to increase a dwell time of the cooling medium flow.

6. The dynamoelectric machine of claim 1, wherein the cooling medium flow is an air flow.

7. The dynamoelectric machine of claim 6, further comprising an external fan or an integral fan designed to generate the air flow.

8. A wind power plant, comprising a dynamoelectric machine, said dynamoelectric machine comprising a stator, a shaft, a rotor Interacting with the stator, said rotor being arranged fixedly on the shaft for conjoint rotation and comprising a winding system, and a slip ring system designed to enable the winding system of the rotor to be contacted electrically and comprising a slip ring body including slip rings which are arranged axially behind one another and spaced apart from one another in an insulated manner and which are assigned to an electrical phase, said slip ring body being connected fixedly to the shaft for conjoint rotation and having between an inner side of the slip ring body and the shaft at least one section designed to form a cavity which is open axially on both sides and is designed as a circumferential cutout so that the slip ring body lies at least on two circumferentially running boundary elements which are spaced apart axially from one another and which are connected through shrink fit in one piece with an inside of the slip ring body and/or of the shaft, wherein the shaft is designed at least in a region of the slip ring system as a hollow shaft which has a hollow shaft portion assigned to the slip ring system for routing feed lines to the winding system of the rotor, and wherein axial recesses are provided on the cavity axially on an inside and axially on an outside for enabling introduction of a cooling medium flow axially into the cavity and discharge of the cooling medium flow into an outlet region, with first ones of the axial recesses being formed about an entire circumference of one of the two circumferentially running boundary elements for introduction of the cooling medium flow, and with second ones of the axial recesses being formed about an entire circumference of the other one of the two circumferentially running boundary elements for discharge of the cooling medium flow.

9. The wind power plant of claim 8, wherein the slip ring system comprises an electrical energy transmission unit in the form of a brush unit which includes one or more brushes assigned to a corresponding one of the slip rings per electrical phase, said brush unit comprising a brush holder for arrangement of the one or more brushes.

10. The wind power plant of claim 8, wherein the boundary elements are designed as rings or webs.

11. The wind power plant of claim 8, wherein in a region of the cavity, the shaft has a reduced diameter portion over a predefined axial length and/or the slip ring body has a widened diameter portion.

12. The wind power plant of claim 8, wherein the cavity is designed to form a labyrinth-like and/or meandering structure in the cavity so as to increase a dwell time of the cooling medium flow.

13. The wind power plant of claim 8, wherein the cooling medium flow is an air flow.

14. The wind power plant of claim 13, wherein the dynamoelectric machine comprises an external fan or an integral fan designed to generate the air flow.

* * * * *